United States Patent
Beckers

(10) Patent No.: US 6,814,492 B2
(45) Date of Patent: Nov. 9, 2004

(54) FLUID TRAP FOR OIL MIGRATION PREVENTION

(75) Inventor: Roland Beckers, Lauffen (DE)

(73) Assignee: Minebea Co., Ltd. (JP)

( * ) Notice: Subject to any disclaimer, the term of this patent is extended or adjusted under 35 U.S.C. 154(b) by 39 days.

(21) Appl. No.: 10/354,566

(22) Filed: Jan. 30, 2003

(65) Prior Publication Data

US 2004/0151410 A1 Aug. 5, 2004

(51) Int. Cl.$^7$ .......................... F16C 32/06; F16C 33/72
(52) U.S. Cl. ................... 384/119; 384/110; 384/132
(58) Field of Search ................................. 384/100, 110, 384/115, 119, 132

(56) References Cited

U.S. PATENT DOCUMENTS

| | | | |
|---|---|---|---|
| 5,403,098 A | * | 4/1995 | Yasui et al. ............. 384/115 |
| 5,423,612 A | * | 6/1995 | Zang et al. ............. 384/119 |
| 5,490,021 A | | 2/1996 | Muller et al. |
| 5,524,986 A | | 6/1996 | Leuthold et al. |
| 5,876,124 A | | 3/1999 | Zang et al. |
| 6,066,903 A | | 5/2000 | Ichiyama |
| 6,144,523 A | * | 11/2000 | Murthy et al. ............. 384/110 |
| 6,196,722 B1 | | 3/2001 | Asada et al. |
| 6,246,136 B1 | | 6/2001 | Ichiyama |
| 6,296,391 B1 | | 10/2001 | Hayakawa et al. |
| 6,307,293 B1 | | 10/2001 | Ichiyama |
| 6,322,252 B1 | | 11/2001 | Grantz et al. |
| 6,669,369 B1 | * | 12/2003 | Nottingham et al. ....... 384/110 |
| 6,672,766 B2 | * | 1/2004 | Nottingham et al. ....... 384/110 |

* cited by examiner

*Primary Examiner*—Thomas R. Hannon
(74) *Attorney, Agent, or Firm*—Joel Lutzker; Anna Vishev; Schulte Roth & Zabel LLP

(57) ABSTRACT

A fluid dynamic bearing assembly including a shaft and a bearing sleeve. A bearing gap is formed between the shaft and the bearing sleeve and is filled with a lubricating fluid. A reservoir containing the excess of the lubricating fluid is formed at one end of the bearing sleeve. The reservoir is not located in close proximity to the shaft. A fluid trapping recess is formed in the shaft, the fluid trap being configured to prevent migration of the lubricating fluid along the shaft into the environment.

14 Claims, 1 Drawing Sheet

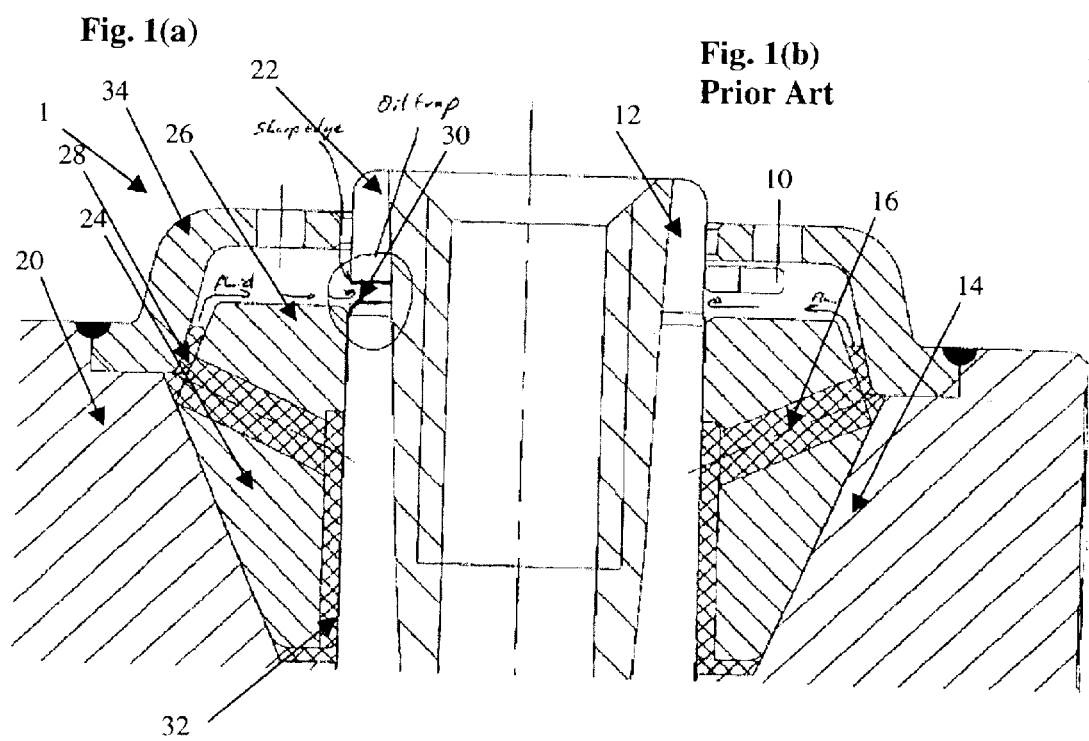

FLUID TRAP FOR OIL MIGRATION PREVENTION

FIELD OF THE INVENTION

The present invention generally relates to a spindle motor. More specifically, the invention relates to a spindle motor utilizing a fluid dynamic pressure bearing to support a shaft within a bearing portion, the shaft being surrounded by lubricating oil enclosed in the bearing portion.

BACKGROUND

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle the information being accessed by means of read/write heads generally located on a pivoting arm which moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such in-spindle motors typically have a spindle mounted by means of two ball bearing systems to a motor shaft disposed in the center of the hub. However, with the decreasing size of information storage systems, other types of bearings including hydrodynamic bearings are being developed.

In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferro-magnetic fluids, or even air have been utilized for use in hydrodynamic bearing systems. The reason for the popularity of the use of air, is the importance of avoiding the outgassing of contaminants into the sealed area of the head disc housing. However, air does not provide the lubricating qualities of oil. Its low viscosity requires smaller bearing gaps and therefore higher tolerance standards to achieve similar dynamic performance.

Thus, in the case of a hydrodynamic bearing employing a liquid lubricant, the lubricating fluid and its components must be sealed within the bearing to avoid loss of lubricant which results in reduced bearing load capacity. Otherwise, the physical surfaces of the spindle and housing could contact one another, leading to increased wear and eventual failure of the bearing system. Equally seriously, loss of a seal or failure to control the fluid level within the bearing system could cause contamination of the hard disk drive with lubricant particles and droplets as well as outgassing-related condensation.

A further difficulty with prior art designs of liquid lubrication hydrodynamic bearings is that, where fluid reservoirs are not placed in close proximity to the shaft, lubricating fluid can splash onto the shaft and migrate along the shaft into the environment. To prevent this oil migration and/or splashing, various physical barriers have been constructed, extending either from the shaft or the bearing sleeve and precluding fluid from ascending the shaft.

An example of the conventional fluid dynamic bearing structure incorporating a physical barrier for oil migration prevention is shown in FIG. 1(b). As shown in this figure, the shaft 12 is placed for rotation into the bearing sleeve 14. The bearing sleeve has a reservoir 16 formed therein such that an opening of the reservoir is not in close proximity to the shaft 12. An oil barrier 10 is mounted on the shaft to prevent lubricating fluid from migrating along the shaft when the fluid is splashed onto the shaft for example during operational shocks.

Forming this additional barrier structure increases the bearing manufacturing time and cost. Therefore there is a need in the art for a low cost structure preventing lubricating fluid migration.

SUMMARY OF THE INVENTION

It is an object of the present invention to provide a fluid dynamic bearing assembly having a fluid trap for oil migration prevention.

In one aspect, the present invention provides a fluid dynamic bearing assembly including a shaft and a bearing sleeve. A bearing gap is formed between the shaft and the bearing sleeve and is filled with a lubricating fluid. A reservoir containing excess of the lubricating fluid is formed at one end of the bearing sleeve. The reservoir is not located in close proximity to the shaft. A fluid trapping recess is formed in the shaft, the fluid trap being configured to prevent migration of the lubricating fluid along the shaft into the environment.

When the bearing assembly experiences shocks during its operation, a small amount of lubricating fluid may be splashed out of the reservoir. Drops of the lubricating fluid will then migrate towards the shaft and will get trapped in the fluid trap. A sharp upper edge of the fluid trap prevents a further upward migration of the fluid into the environment.

The above advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which:

FIG. 1(a) is a partial vertical cross-sectional view of a fluid dynamic bearing having a lubricating fluid reservoir located away from the shaft and a fluid trap formed on the shaft.

FIG. 1(b) is a partial vertical cross-sectional view of a fluid dynamic bearing having a lubricating fluid reservoir located away from the shaft and a physical barrier extending from the shaft and preventing fluid from migration.

DETAILED DESCRIPTION

As shown in FIG. 1(a), the fluid dynamic bearing assembly 1 comprises a shaft 22 and a bearing sleeve 20. The bearing sleeve is provided with a cylindrical inner opening 32. The shaft is inserted into the cylindrical opening of the bearing sleeve 20 in such a way as to insure sleeve's free rotation with respect to the shaft. The shaft is preferably secured to a top cover (not shown) of the disc drive. Although the shaft 22 is shown as the stationary component of the assembly, it is to be appreciated by a person skilled in the art that the bearing sleeve may be the stationary component and the shaft may be constructed as a rotational component of the assembly.

A shield 34 may be mounted on the sleeve 20 to enclose the bearing assembly. A central opening is formed in the shield 34 allowing the shaft 22 to extend beyond the shield 34 to be secured to the top cover (not shown).

Shaft 22 may be further provided with a bearing cone 24 supported on an outer surface of the shaft. Bearing cone 24 further incorporates a sealing element 26. In the preferred embodiment, the bearing cone and the sealing element form a capillary seal and a lubricating fluid reservoir 28. In the preferred embodiment, the fluid reservoir is not formed within a close proximity to the shaft. A bearing gap is formed between the shaft 22 with the bearing cone 24 and the bearing sleeve 20. The bearing gap is filled with a lubricating fluid, preferably oil.

Either the outer surface of the shaft or the inner surface of the bearing sleeve may be provided with radial dynamic pressure generating grooves (not shown). When the sleeve 20 rotates with respect to the shaft 22, radial dynamic pressure generating grooves generate a radial dynamic pressure in the lubricating oil, thus allowing the bearing sleeve to rotate without touching the outer surface of the shaft.

A fluid trapping recess 30 is formed on the shaft 22. The recess is provided with a sharp upper edge, which serves as a migration barrier to the lubricating fluid. The fluid trap 30 may be formed during an ordinary shaft manufacturing process without increasing the time and cost of manufacturing the bearing assembly. No additional mechanical structures are necessary to prevent fluid from ascending the shaft.

As shown in FIG. 1(a), during operational shocks occurring in the process of sleeve's rotation, a small amount of lubricating fluid may escape the capillary seal and reservoir 28 and migrate toward the shaft 22. When drops of migrating fluid reach the fluid trapping recess 30, these drops accumulate in the trap. The sharp upper edge of the trapping recess prevents fluid from migrating further upwards, thus confining the splashed fluid within the boundaries of the recess. An oil repellent film may be applied to the shaft's surface above the fluid trapping recess 30.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A fluid dynamic bearing assembly comprising:

a shaft;

a bearing sleeve;

a bearing gap formed between said shaft and said bearing sleeve;

a lubricating fluid contained within said bearing gap;

a reservoir formed at a first end of the bearing sleeve, said reservoir containing excess of said lubricating fluid; and a fluid trap formed in the shaft, wherein said reservoir is not located in close proximity to said shaft and wherein said fluid trap is configured to prevent migration of said lubricating fluid along said shaft into the environment.

2. The fluid dynamic bearing assembly according to claim 1, wherein said fluid trap further comprises a sharp upper edge preventing upward migration of said lubricating fluid.

3. The fluid dynamic bearing assembly according to claim 1, wherein said lubricating fluid is oil.

4. The fluid dynamic bearing assembly according to claim 1, wherein an oil repellent film is applied to the surface of said shaft above said fluid trap.

5. The fluid dynamic bearing assembly according to claim 1, wherein said reservoir comprises a capillary seal.

6. The fluid dynamic bearing assembly according to claim 5, wherein said capillary seal is a tapered capillary seal.

7. The fluid dynamic bearing assembly according to claim 1, wherein at least one of said shaft and said bearing sleeve further comprises at least one set of radial fluid dynamic grooves generating radial dynamic pressure in the lubricating fluid.

8. A fluid dynamic bearing assembly comprising:

a shaft, said shaft further comprising a bearing cone;

a bearing sleeve;

a bearing gap formed between said shaft with said bearing cone and said bearing sleeve;

a lubricating fluid contained within said bearing gap;

a reservoir formed by said bearing cone, said reservoir containing excess of said lubricating fluid; and a fluid trap formed in the shaft, wherein said reservoir is not located in close proximity to said shaft and wherein said fluid trap is configured to prevent migration of said lubricating fluid along said shaft into the environment.

9. The fluid dynamic bearing assembly according to claim 8, wherein said fluid trap further comprises a sharp upper edge preventing upward migration of said lubricating fluid.

10. The fluid dynamic bearing assembly according to claim 8, wherein said lubricating fluid is oil.

11. The fluid dynamic bearing assembly according to claim 8, wherein an oil repellent film is applied to the surface of said shaft above said fluid trap.

12. The fluid dynamic bearing assembly according to claim 8, wherein said reservoir comprises a capillary seal.

13. The fluid dynamic bearing assembly according to claim 12, wherein said capillary seal is a tapered capillary seal.

14. The fluid dynamic bearing assembly according to claim 8, wherein at least one of said shaft and said bearing sleeve further comprises at least one set of radial fluid dynamic grooves generating radial dynamic pressure in the lubricating fluid.

* * * * *